(12) United States Patent
Hamiti et al.

(10) Patent No.: US 10,530,206 B2
(45) Date of Patent: Jan. 7, 2020

(54) ELECTRIC MACHINE COMPRISING A ROTOR WITH ANGLED INTERIOR PERMANENT MAGNETS

(71) Applicant: Institut Vedecom, Versailles (FR)

(72) Inventors: Tahar Hamiti, Montigny le Bretonneux (FR); Franck Vangraefschepe, Nanterre (FR); Raouf Benlamine, Issy-les-Moulineaux (FR)

(73) Assignee: INSTITUT VEDECOM, Versailles (FR)

( * ) Notice: Subject to any disclaimer, the term of this patent is extended or adjusted under 35 U.S.C. 154(b) by 0 days.

(21) Appl. No.: 16/465,507

(22) PCT Filed: Nov. 27, 2017

(86) PCT No.: PCT/FR2017/053258
§ 371 (c)(1),
(2) Date: May 30, 2019

(87) PCT Pub. No.: WO2018/100276
PCT Pub. Date: Jun. 7, 2018

(65) Prior Publication Data
US 2019/0334396 A1    Oct. 31, 2019

(30) Foreign Application Priority Data

Dec. 1, 2016 (FR) ..................................... 16 61770

(51) Int. Cl.
*H02K 21/12*        (2006.01)
*H02K 1/27*         (2006.01)
(Continued)

(52) U.S. Cl.
CPC ........... *H02K 1/2766* (2013.01); *H02K 21/02* (2013.01); *H02K 21/16* (2013.01); *H01F 7/0205* (2013.01)

(58) Field of Classification Search
CPC .............................. H02K 21/16; H02K 1/2766
(Continued)

(56) References Cited

U.S. PATENT DOCUMENTS

| | | | |
|---|---|---|---|
| 3,840,763 A | 10/1974 | Baumann et al. | |
| 8,933,606 B2 * | 1/2015 | Rahman ............... | H02K 1/2706 310/156.57 |

(Continued)

FOREIGN PATENT DOCUMENTS

| | | |
|---|---|---|
| DE | 19915664 A1 | 10/2000 |
| JP | 2016163462 A | 9/2016 |

OTHER PUBLICATIONS

International Search Report for PCT/FR2017/053258 dated Mar. 16, 2018.
Written Opinion for PCT/FR2017/053258 dated Mar. 16, 2018.

*Primary Examiner* — Hanh N Nguyen
(74) *Attorney, Agent, or Firm* — Sandberg Phoenix & von Gontard, P.C.

(57) ABSTRACT

The present invention concerns a brushless electric machine with a rotor having interior permanent magnets, characterised in that the rotor consists of a tubular core (1), said core (1) having N pairs of longitudinal slots (2, 3) having trapezoidal cross-section, a width $L_a$ and a length L, where $L_a/L$ is between 0.25 and 0.35, the two slots (2, 3) of a pair extending on either side of the median radial plane, at an angle of 7.5°±1.5°, the core having, in the region of convergence of each pair of slots, a longitudinal channel (10) opening on either side of the front ends of the core (1).

11 Claims, 4 Drawing Sheets

(51) Int. Cl.
*H02K 21/16* (2006.01)
*H02K 21/02* (2006.01)
*H01F 7/02* (2006.01)

(58) Field of Classification Search
USPC ............ 310/156.01, 156.38, 156.53, 156.56, 310/156.57
See application file for complete search history.

(56) References Cited

U.S. PATENT DOCUMENTS

| | | | | |
|---|---|---|---|---|
| 2005/0200223 A1* | 9/2005 | Tajima | ................. | H02K 1/2766 310/156.46 |
| 2013/0154425 A1* | 6/2013 | Nakada | ................. | H02K 1/2766 310/156.53 |
| 2015/0102695 A1* | 4/2015 | Zhang | ................. | H02K 1/2766 310/156.53 |

* cited by examiner

ELECTRIC MACHINE COMPRISING A ROTOR WITH ANGLED INTERIOR PERMANENT MAGNETS

CROSS-REFERENCE TO RELATED APPLICATIONS

This application is the US National Stage under 35 USC § 371 of International Application No. PCT/FR2017/053258, filed 27 Nov. 2017 which claims priority to French App. No. 1661770 filed 1 Dec. 2016, both of which are herein incorporated by reference.

BACKGROUND

The present invention concerns the field of rotating brushless electric machines with interior permanent magnets (IPM) which make it possible to reduce the quantity of magnets used without reducing the torque produced by the electric machine.

The electric machine can be powered by an engine or a generator.

In such machines, the rotor comprises a stack of ferromagnetic plates that are generally ring-shaped with a roughly circular section, equipped with a rotating shaft insertion hole through which a rotating shaft extends.

In addition, the outer circumferential side of the rotor laminations is equipped with roughly rectangular magnet insertion holes in which the main cubic magnets are inserted.

State of the Art

There are a number of interior permanent magnet machine solutions in the prior art.

For example, the Japanese patent Pub. No. JP2016163462 describes a brushless electric machine with interior permanent magnets. The rotor of this known solution consists of a tubular core with an external diameter $D_{ext}$ and an internal diameter $D_{int}$. The core has N pairs of longitudinal slots having trapezoidal cross-section. The two slots of a pair of slots extend on either side of the median radial plane.

U.S. Pat. No. 3,840,763 describes an electric machine comprising a plurality of low-density permanent magnets with weak flux, contained in a ferromagnetic core to increase the magnetic field of the electric machine. The slots of a pair of slots extend on either side of the median radial plane at an angle of approximately 15°. The magnets are positioned in a preferred range at an angular orientation with respect to the main flux path of the electric machine to maximize the magnetic flux density in the core without exceeding the core's saturation flux density. The relationship between the flux density of the magnets at their maximum energy point and the saturation flux density of the core determines the preferred range of retention angles of the magnets.

German patent application DE1991S664 describes a machine comprising a stator and at least one stack of rotor plates. This stack of plates is characterized in that the plates in the stack have at least two different cut-out parts, in that at least one of the plates in one of the cut-out parts has the means to lock the plates radially within the stack, in particular when the individual plates are axially assembled. The slots have a section with a roughly trapezoidal shape, but without a longitudinal channel in the region of convergence of each pair of slots.

Drawbacks of the Prior Art

Prior art solutions pose problems with regard to magnetic leakage. Effectively, maintaining the interior magnets involves the presence of bridges to ensure the calibration of the magnet, subject to significant centrifugal forces. But these bridges cause magnetic leakage, which reduces the performance of the electric machine.

Moreover, the complex mechanical structures of certain prior art solutions are not well suited to machines that run at high speeds.

BRIEF SUMMARY

To address the drawbacks of the prior art, the present invention concerns, in its broadest sense, a brushless electric machine with interior permanent magnets. The rotor comprises a tubular core with an external diameter $D_{ext}$ and an internal diameter $D_{int}$, where $D_{ext}/D_{int}$ is between 1.3 and 1.4, the core having N pairs of longitudinal slots having trapezoidal cross-section, a width $L_a$ and a median length L, with $L_a/L$ being between 0.25 and 0.35, the two slots of a pair of slots extending on either side of the median radial plane, at an angle of 7.5°±1.5°, the core having, in the region of convergence of each pair of slots, a longitudinal channel opening on either side of the front ends of the core.

"Width" means the measured distance between the two bases of the trapezoidal section. These two bases are parallel, and form, with the radial direction of the rotor, an angle of 7.5°±1.5°.

"Median length" means the measured distance between the two sides linking the two aforementioned bases, on an axis that is parallel to the bases, and passing through the center of the line that is perpendicular to the two bases.

According to the second variant, the core comprises a stack of ferromagnetic plates.

Ideally, the slots open at the outer periphery of the core onto notches whose width is less than the width of the notches. Advantageously, the cross-section of the channels is between 0.8 and 1.2 times the width of the slots.

Based on the first variant, the magnets are magnetized alternately in opposite directions.

Based on the second variant, the rotor comprises alternating pairs of adjacent magnets magnetized in the same direction. Ideally, N is greater than or equal to 12.

Based on the first approach, the stator has k·N teeth, where k is a whole number or a fraction, where the longitudinal teeth extend radially in the direction of the rotor, from an external ring-shaped yoke, where at least some of the longitudinal teeth are surrounded by an electric coil. Based on another approach, the stator has k·N teeth, where k is a whole number or a fraction, where the longitudinal teeth are twisted and extend radially in the direction of the rotor, from an external ring-shaped yoke, where at least some of the twisted teeth are surrounded by an electric coil.

Based on another approach, the rotor is twisted at multiple angles of a statoric half-tooth pitch.

DESCRIPTION OF THE FIGURES

The present invention is better understood by reading the following detailed description of a non-limiting example of the invention, and referring to the drawings in the appendix, where.

DETAILED DESCRIPTION

Description of the Rotor

Figure 1:
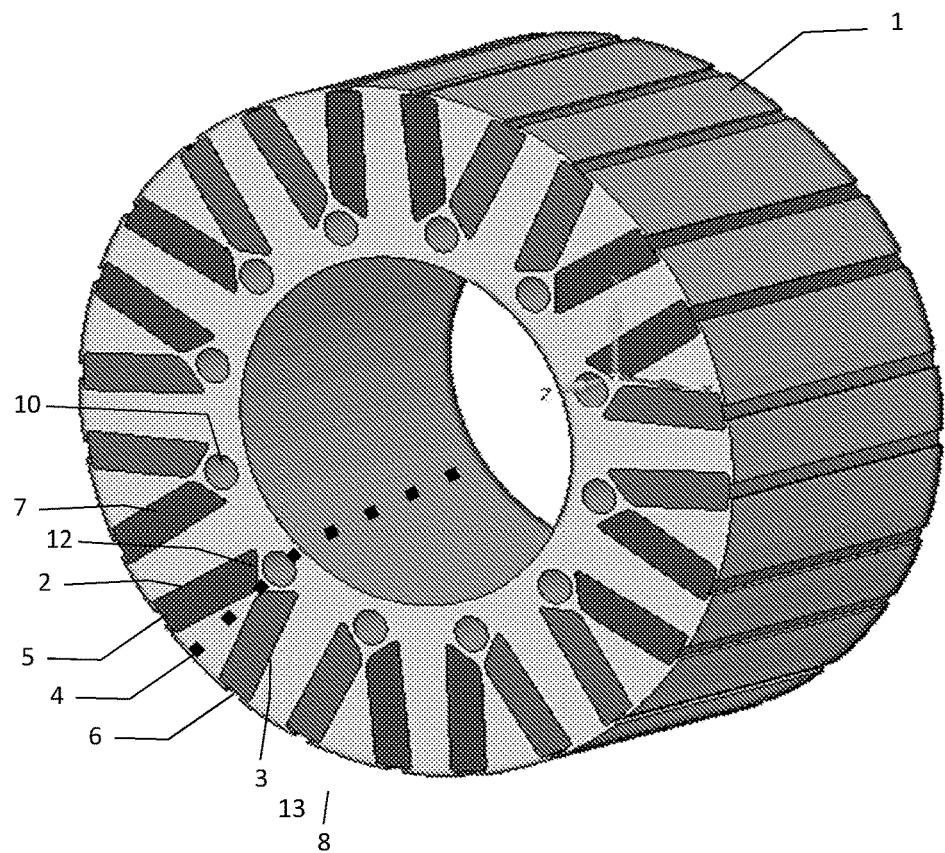
FIG. 1 shows a perspective view of a first exemplary embodiment of a rotor for an electric machine.

FIG. 1 shows a perspective view of the first illustrative embodiment of a rotor for an electric machine.

The rotor comprises a tubular-shaped core (1) having 6 pairs of poles. The core (1) has pairs of longitudinal slots (2, 3), cutting through the core of the rotor for its entire length. The slots (2, 3) of a pair of slots form a "V", with each one their median cross-section planes forming a 7.5° angle with the median plane (4) passing through the center of the slots. The angle formed by the median cross-section planes of the two consecutive or adjacent slots (2,3) is thus 15°. The slots (2, 3) open at the external peripheral surface of the rotor at openings (5, 6), the width of which is less than the width of the slots (2, 3) to form retaining edges on either side of the median plane of the slots (2, 3), the retaining edges retaining the magnets which are inserted into these slots.

Permanent magnets, in the form of trapezoidal bars, are inserted into these slots (2, 3). In the example described above, the magnets of a pair of slots are magnetized in opposite directions. In addition, two consecutive slots (2, 7) or (3, 8) belonging to adjacent pairs of slots, receive magnets in the same direction of magnetization.

The inner surfaces (12, 13) of the magnets inserted into the slots (2, 3) are chamfered. With respect to these chamfers, the core has longitudinal channels (10) which cut across the rotor. These longitudinal channels (10) help to reduce magnetic leakage. They also help to circulate air or coolant in the rotor.

In general, the brushless electric machine comprises a tubular core (1) having an external diameter $D_{ext}$ and an internal diameter $D_{int}$.

The core (1) has N pairs of slots (2, 3) which extend longitudinally. The cross-section of its slots is trapezoidal and the parallel bases of the trapezoid extend in a direction that is almost radial. The parallel bases of the trapezoid ideally form an angle of approximately 7.5° with the radial direction. The two adjacent slots, with respect to the cross-section, form a V which extends on either side of the radial plane, passing through the center of the slots. In the region of convergence of each pair of slots (2, 3) the core has a longitudinal channel (10) opening on either side of the front ends of the core (1), and located close to the inner periphery of the core. The permanent magnets, in the shape of trapezoidal bars that are the same shape as the slots (2, 3), are inserted into these slots (2, 3). The inner surfaces (12, 13) of said magnets are chamfered.

Figure 2:
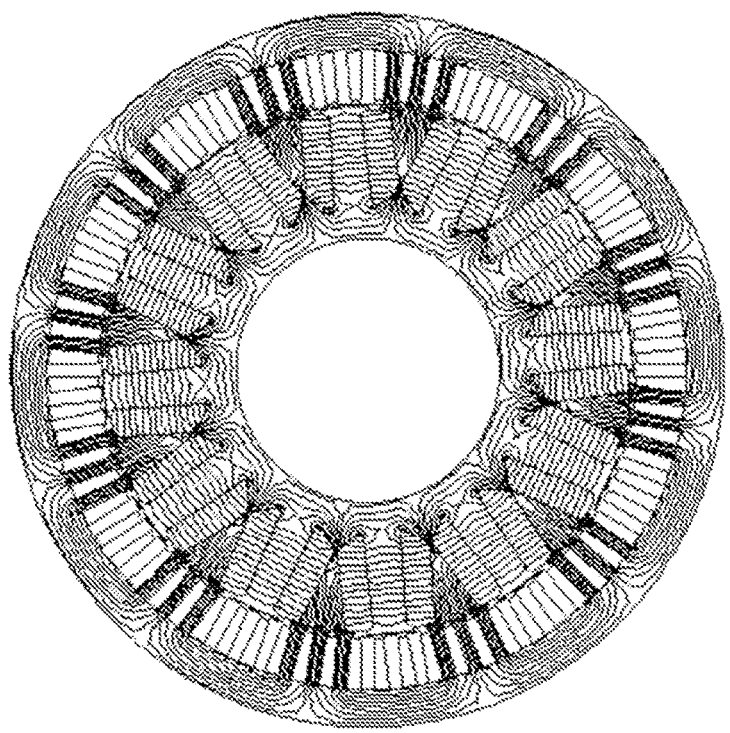
FIG. 2 shows a map of the magnetic field lines corresponding to the example in the first approach.

FIG. 2 shows a map of the magnetic field lines of a 12-pole motor, corresponding to the example in the first approach.

Figure 3:
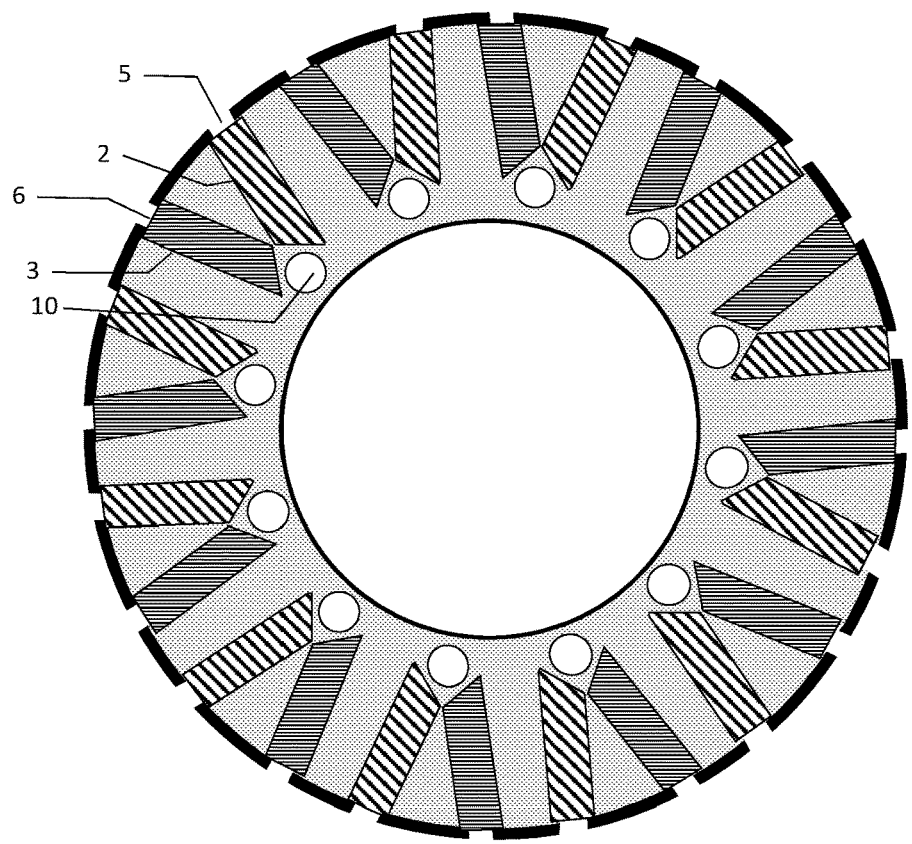
FIG. 3 shows a cross-section view of a second exemplary embodiment of a rotor for an electric machine.

FIG. 3 shows an alternative approach, with a core structure that is identical to that of the first example illustrated by FIG. 1. However, the magnets are magnetized in opposite directions, whereas in the previous example, two consecutive magnets have the same magnetization.

Figure 4:
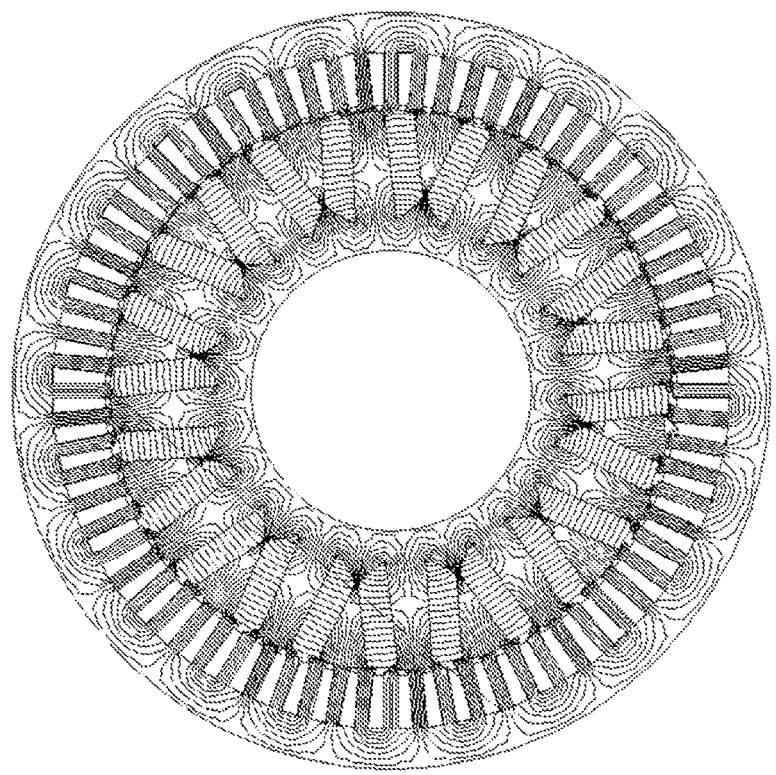
FIG. 4 shows a map of the magnetic field lines corresponding to the example in the second approach.

FIG. 4 shows a map of the magnetic field lines of a 24-pole motor, corresponding to the example in the second approach.

Stator Description

Figure 5:
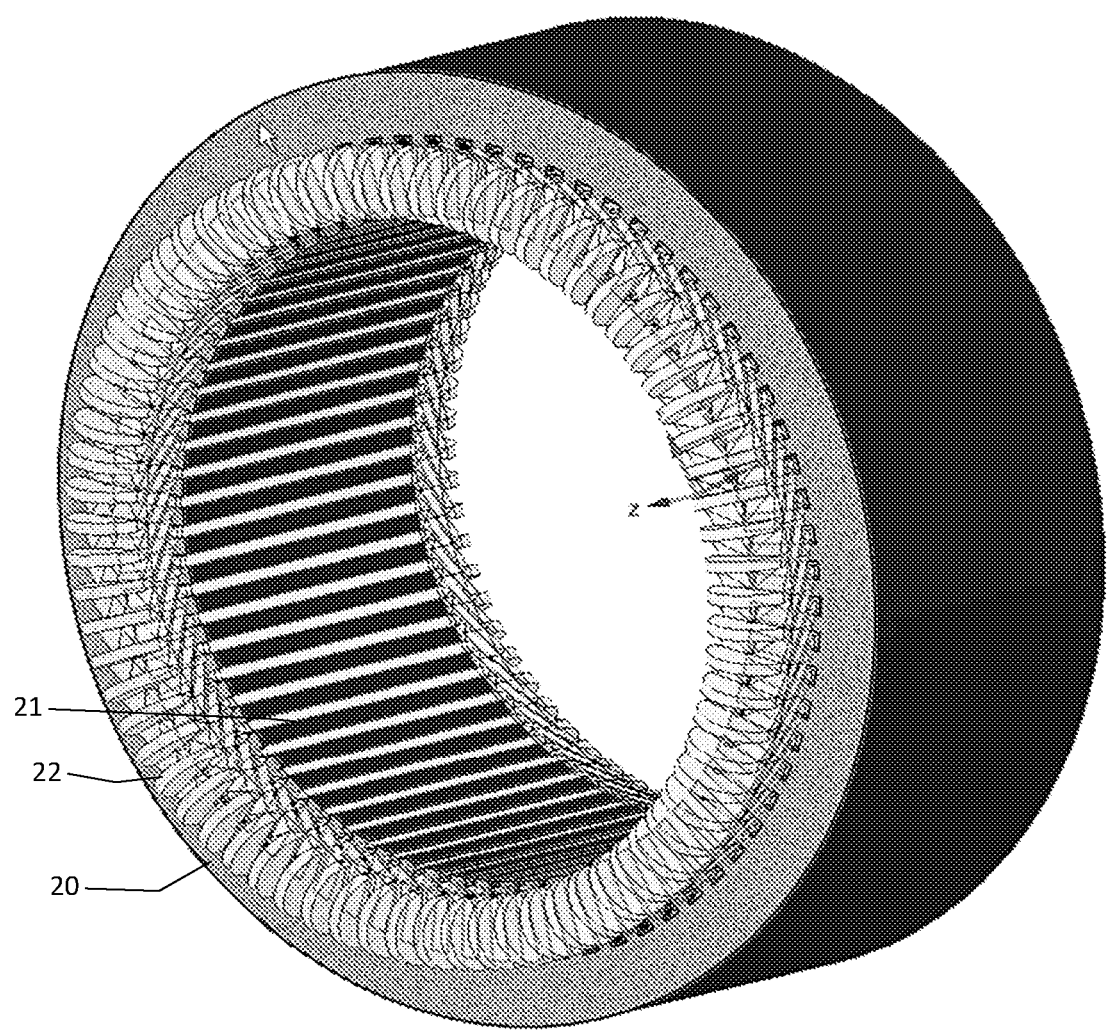
FIG. 5 shows a cross-section perspective view of the second exemplary embodiment of a stator for an electric machine.

The stator, depicted in FIG. 5, is made up of a ring-shaped yoke (20) having 72 teeth (21), extending radially. These teeth are surrounded by coils (22) that are alternately charged.

Based on one specific approach, these teeth extend not longitudinally but helically, with twisting of a few degrees between the two front ends of the stator.

Figure 6:
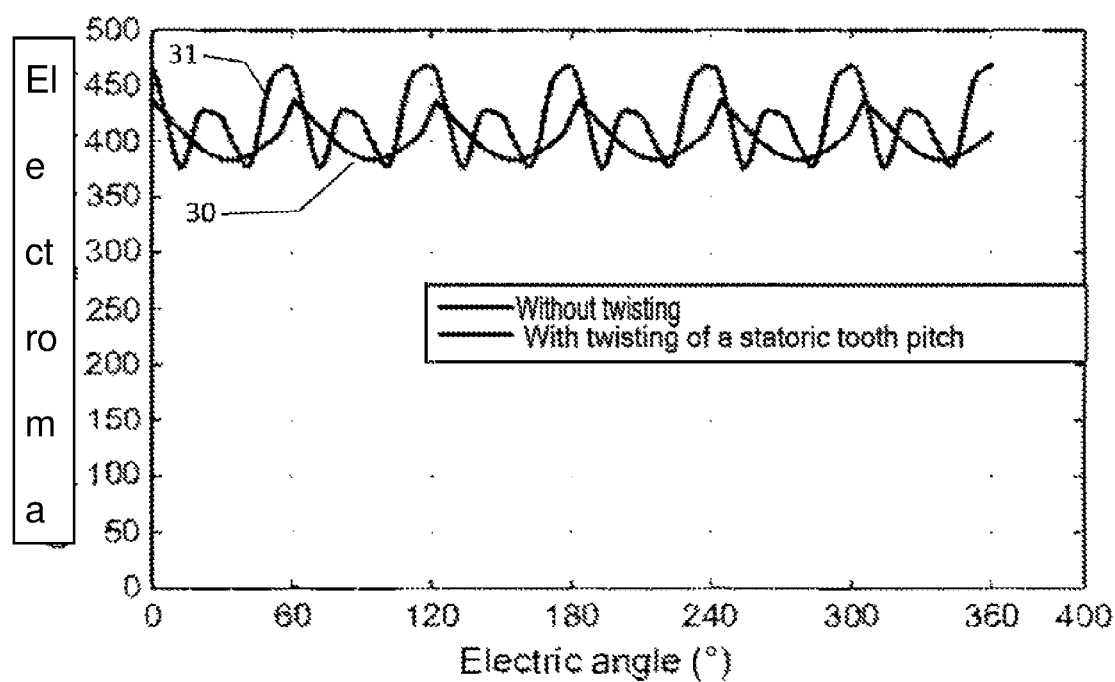
FIG. 6 shows the electromagnetic torque curve based on the electric angle corresponding to two operating procedures for the electric machine.

Such a configuration makes it possible to reduce the electromagnetic torque variations as a function of the electric angle, as shown in FIG. 6, showing:

for the curve (30), the torque variation with twisted teeth for the curve (31), the torque variation with longitudinal teeth.

The invention claimed is:

1. A brushless electric machine comprising a rotor with interior permanent magnets wherein the rotor comprises a tubular core having N pairs of longitudinal slots, the slots each having a trapezoidal cross-section, a width $L_a$, and a median length L; the two slots of a pair of slots extending on either side of a median radial plane of the rotor, at an angle of 7.5°±1.5°, the core having, in a region of convergence of each pair of slots, a longitudinal channel opening on either side of front ends of the core.

2. The brushless electric machine according to claim 1, wherein the ratio $L_a/L$ is between 0.25 and 0.35.

3. The brushless electric machine according to claim 1, wherein said core comprises a stack of ferromagnetic plates.

4. The brushless electric machine according to claim 1, wherein said slots open at the outer periphery of the core inside notches whose width is less than the width of said slots (2, 3).

5. The brushless electric machine according to claim 1, wherein a diameter of the cross-section of said longitudinal channels is between 0.8 and 1.2 times the width of said slots.

6. The brushless electric machine according to claim 1, wherein the magnets are alternately magnetized in opposite directions.

7. The brushless electric machine according to claim 1, wherein the rotor comprises alternating pairs of adjacent magnets magnetized in the same direction.

8. The brushless electric machine according to claim 1, wherein N is greater than or equal to 12.

9. The brushless electric machine according to claim 1, further comprising a stator, the stator having k·N teeth, where k is a whole number, where said teeth are longitudinal and extend radially in the direction of the rotor, from an external ring-shaped yoke where at least some of said longitudinal teeth are surrounded by an electric coil.

10. The brushless electric machine according to claim 1, further comprising a stator, the stator having k·N teeth (21), where k is a whole number or a fraction, where said teeth are twisted and extend radially in the direction of the rotor, from an external ring-shaped yoke, where at least some of said teeth are surrounded by an electric coil.

11. The brushless electric machine according to claim 1, wherein the rotor is twisted at multiple angles of a statoric half-tooth pitch.

* * * * *